United States Patent [19]

Frey

[11] Patent Number: 4,972,664

[45] Date of Patent: Nov. 27, 1990

[54] COMBINE ATTACHMENT

[76] Inventor: Jeffrey R. Frey, 13 Radcliff Rd., Willow Street, Pa. 17584

[21] Appl. No.: 401,117

[22] Filed: Aug. 31, 1989

[51] Int. Cl.⁵ .............................................. A01D 34/66
[52] U.S. Cl. ...................................... 56/13.6; 56/15.2; 56/15.8; 56/15.9
[58] Field of Search ................... 56/1, 2, 6, 13.5, 13.6, 56/13.7, 14.9, 15.1, 15.2, 15.8, 15.9, 16.3, DIG. 6, DIG. 10

[56] References Cited

U.S. PATENT DOCUMENTS

| | | | |
|---|---|---|---|
| 3,345,808 | 10/1967 | Van der Lely | 56/15.1 |
| 3,516,233 | 6/1970 | Johnson et al. | 56/6 |
| 3,619,996 | 11/1971 | Jacobson . | |
| 3,699,754 | 10/1972 | Koch et al. | 56/15.8 |
| 3,835,628 | 9/1974 | Case . | |
| 4,048,790 | 9/1977 | Zweegers | 56/15.9 |
| 4,085,570 | 4/1978 | Joray . | |
| 4,206,582 | 6/1980 | Molzahn et al. | 56/15.8 |
| 4,267,687 | 5/1981 | Neuhring . | |
| 4,286,423 | 9/1981 | Caldwell et al. | 56/15.9 |
| 4,495,754 | 1/1985 | Cartner . | |
| 4,497,160 | 2/1985 | Mullet et al. | 56/13.6 |
| 4,723,396 | 2/1988 | Ermacora . | |
| 4,724,661 | 2/1988 | Blakeslee et al. | 56/15.8 |

Primary Examiner—Bruce M. Kisliuk
Attorney, Agent, or Firm—Fleit, Jacobson, Cohn, Price, Holman & Stern

[57] ABSTRACT

A combine or power unit attachment by which two disc mower-conditioner units are attached to and driven by a combine with the mower-conditioners being arranged at slight opposing angles and in slightly staggered relation for discharge of the cut material in side-by-side relationship to form a single windrow. The mower-conditioners attached to the combine are in and of themselves a known structure and the combine or power unit in and of itself is a known structure with the attachment enabling the mower-conditions to be connected to, supported from and driven from the feeder housing on the combine with the attachment including a supporting framework that is quickly and easily attached to and removed from the feeder housing, a drive connection extending from each side of the feeder housing and a control mechanism for controlling the attitude of the mower-conditioners.

16 Claims, 3 Drawing Sheets

COMBINE ATTACHMENT

BACKGROUND OF THE INVENTION

1. Field of the Invention

The present invention generally relates to a combine attachment by which two disc mower-conditioner units are attached to and driven by a combine or power unit with the mower-conditioners being arranged at slight opposing angles and in slightly staggered relation for discharge of the cut material in side-by-side relationship to form a single windrow. The mower-conditioners attached to the combine or power unit are in and of themselves a known structure and the combine or power unit in and of itself is a known structure with the attachment enabling the mower-conditioners to be connected to, supported from and driven from the feeder housing on the combine with the attachment including a supporting frame that is quickly and easily attached to and removed from the feeder housing, a drive assembly at each side of the feeder housing and a control mechanism for controlling the attitude of the mower-conditioners.

2. Information Disclosure Statement

Combines, harvesters, gleaners and similar self-propelled farm implements are customarily provided with interchangeable headers to enable various crops to be cut or harvested. The following U.S. patents relate to this field of endeavor.

3,619,996
3,835,628
4,085,570
4,267,687
4,495,754
4,723,396

U.S. Pat. No. 4,085,570 discloses a harvester of the self-propelled type with an attachment mounted on the forward end thereof. U.S. Pat. No. 4,267,687 also discloses a conventional grain combine and a conventional hay pickup together with an adaptor unit connecting the hay pickup unit to the combine. U.S. Pat. No. 4,723,396 discloses a mower unit with a hitch assembly. While the prior art discloses the basic concept of attaching a crop cutting or treating apparatus to a combine, the prior art does not disclose the specific attachment of this invention.

SUMMARY OF THE INVENTION

An object of the present invention is to provide a combine or power unit attachment by which two hay mower-conditioners are attached to, supported from, driven from and positionally controlled from a self-propelled combine or power unit with no or minimal modifications being made in the conventional combine or power unit and in the conventional mower-conditioners.

Another object of the invention is to provide a combine or power unit attachment in accordance with the preceding object in which the attachment forming the present invention includes a main frame that is supported from the feeder housing of the combine by utilizing the conventional and existing connecting and supporting arrangement incorporated into the feeder housing of the combine or power unit with the attachment being connected to the feeder housing of the combine or power unit in the same manner that other interchangeable headers are connected to the feeder housing of the combine or power unit.

A further object of the present invention is to provide a combine or power unit attachment in accordance with the preceding objects in which the main frame includes forwardly extending spring supported floating arms constructed in a manner to enable the left mower-conditioner to be mounted slightly ahead of the right mower-conditioner so that they do not hit each other during operation with the floating arms also being constructed to support the mower-conditioners at slight opposing angles with the mower-conditioners being driven in a manner to discharge cut hay toward the center of the combine or power unit into a single windrow.

Still another object of the invention is to provide a combine or power unit attachment in accordance with the preceding objects in which the mower-conditioners are driven from both sides of the feeder housing of the combine with one mower-conditioner being driven by a flexible chain coupling and the other mower-conditioner being driven by a notched belt drive arrangement with the drive assemblies including drive shaft arrangements and belt drive arrangements from an input gear box forming part of the attachment to input drive shafts on the mower-conditioners.

A still further object of the invention is to provide a combine or power unit attachment in accordance with the preceding objects in which the mower-conditioners are connected to the main frame by a pivotal or swivel support structure and hydraulic ram structure to enable the pitch or the cutting angle of the mower-conditioners to be varied with a height sensor being provided to indicate the position of the mower-conditioners and a stabilizer extending between and connected to the mower-conditioners.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
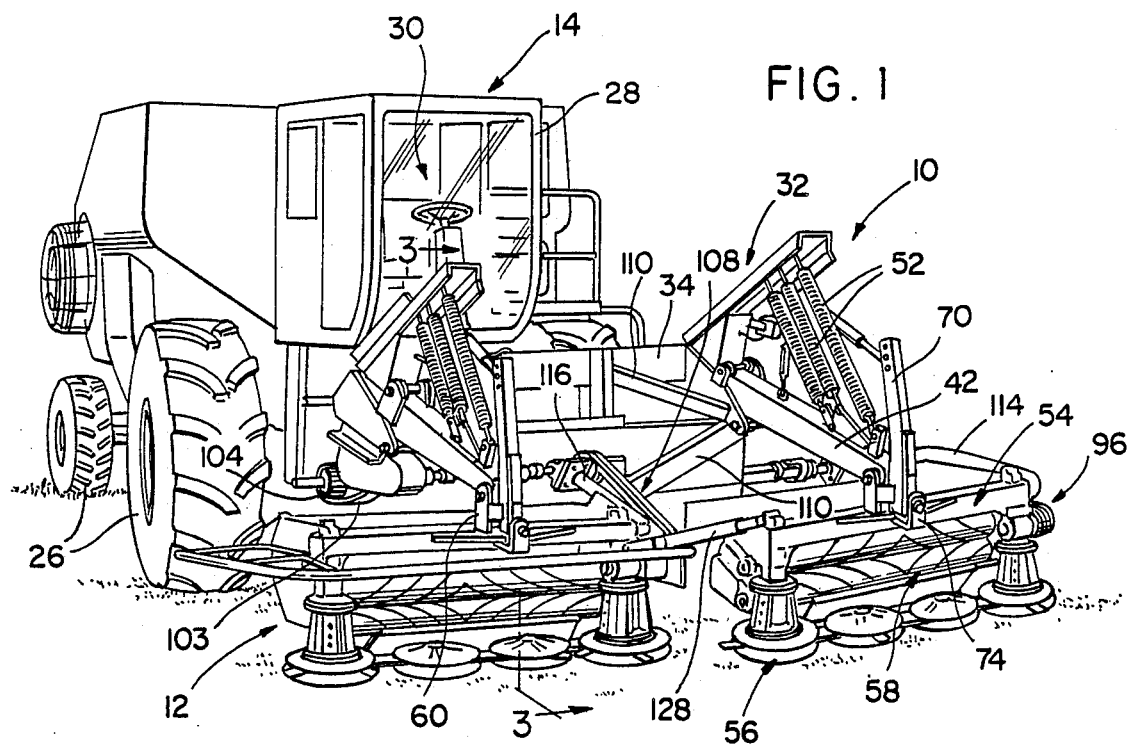
FIG. 1 is a perspective view of the combine or power unit attachment illustrating its association with an existing combine and existing mower-conditioners.

Referring now specifically to the drawings, the combine or power unit attachment of the present invention is generally designated by reference numeral 10 and effectively attaches a pair of conventional mower-conditioners (hereinafter referred to as "mowers") 12 to a conventional self-propelled combine 14. While various conventional combines may be used in this combination, the combine 14 illustrated is a Duetz-Allis, Model Gleaner N6 and the mowers are Kuhn, Model FC200 Disc Mower-Conditioners. Other conventional mowers can be attached to other conventional combines or power units with the attachment 10 of the present invention enabling the mowers 12 to be quickly and easily attached to or removed from the combine 14.

Figure 2:
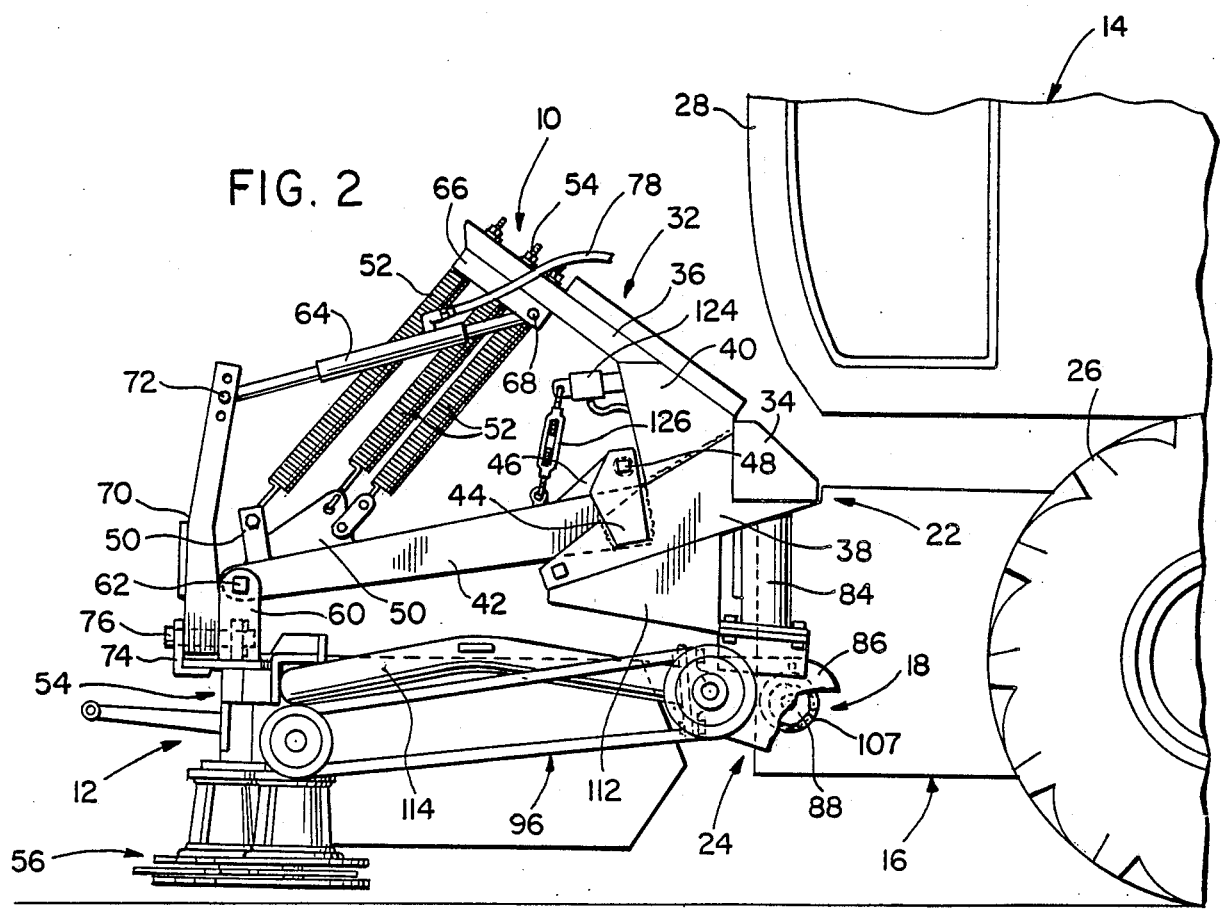
FIG. 2 is a side elevational view of the attachment.
Figure 5:
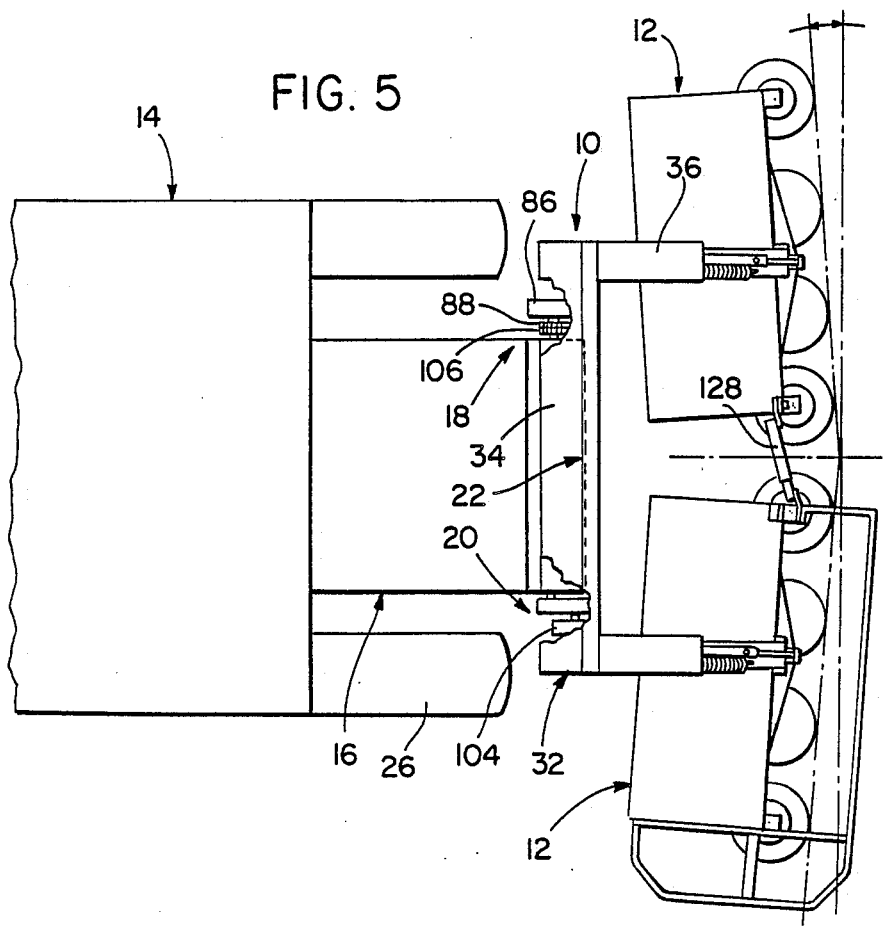
FIG. 5 is a schematic top plan view of the combine attachment illustrating the angulation of the mower-conditioners.

As shown in FIGS. 2 and 5, the combine 10 includes a header housing 16 extending from the forward end thereof which includes drive units 18 and 20 at the lower outer corners thereof and structure 22 at the upper end thereof on which the attachment 10 rests and latch structures 24 at the lower corners thereof to detachably mount the attachment 10 to the header housing 16. The combine also includes supporting and driving wheels 26 and a cab 28 in which controls 30 are provided to enable an operator to control the combine 14 and the mowers 12 or other header that is mounted on the header housing of the combine with the present invention being attached to the conventional existing combine 14 without any modification of the combine with the attachment replacing any header that has been removed from the combine.

Figure 3:
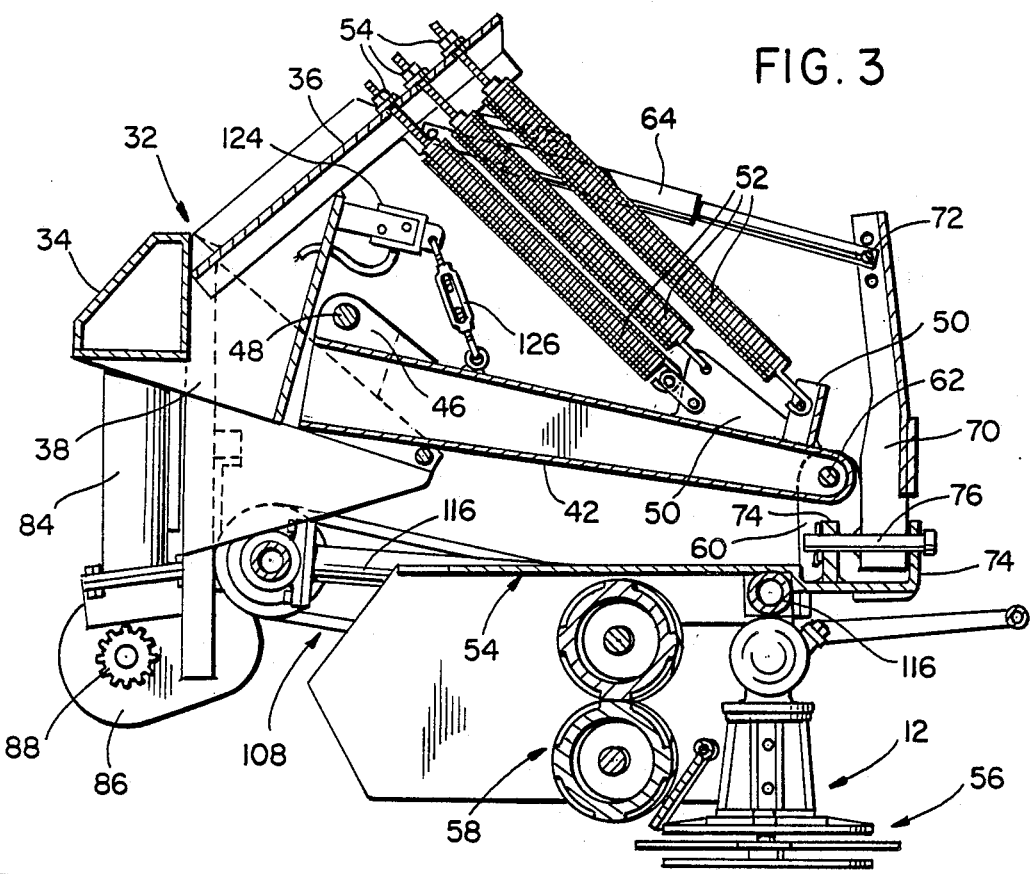
FIG. 3 is a vertical, sectional view taken substantially upon a plane passing along section line 3—3 on FIG. 1 illustrating structural details of the attachment.

As shown in FIGS. 1-4, the attachment 10 includes a main frame 32 which includes a generally horizontally disposed transversely extending top frame member 34 which may be of angle iron configuration or hollow tubular configuration and is disposed at the upper rear corner of the main frame as illustrated in FIGS. 2 and 3. Extending forwardly and upwardly from the main frame 34 is a pair of rigid arms 36 which may be of inverted channel-shaped configuration. The rigid arms 36 are rigidly affixed to the frame member 34 by the provision of forwardly extending plates 38 affixed to the main frame member 34 by welding or the like and extending forwardly and downwardly therefrom as illustrated in FIGS. 2 and 3 and brace plates 40 interconnecting the plates 38 and the arms 36 thus providing a rigid support structure for the rigid arms 36 with these components being welded together.

A pair of floating arms 42 extend forwardly from the plates 38 and are pivotally supported therefrom by support plates or lugs 44 welded to the plates 38 and extending upwardly therefrom forwardly of the brace plates 40 as illustrated in FIG. 2. The rearward upper end of the floating arm includes lugs 46 positioned inwardly of the lugs 44 with the lugs 44 and 46 being pivotally interconnected by a pivot pin or bolt 48 thereby enabling the floating arm 42 to pivot about a transverse axis defined by the pivot pin or bolt 48. Adjacent the outer end of each floating arm, upstanding lugs or plates 50 are provided on the upper surface thereof and a plurality of tension coil springs 52 interconnect the lugs or plates 50 on the floating arm 42 with the outer end of the rigid support arm 36 with the ends of the springs 52 being adjustably connected to the arm 36 by screw threaded bolt and nut assemblies 54 which are connected to the ends of the springs 52. As illustrated, three springs 52 are used but it is pointed out that any number of springs can be used depending upon the load requirements of the mowers supported from the attachment 10. With the springs 52 supporting the outer end of each of the floating arms 42, the mowers 12 will be floatingly supported in relation to the main frame 32 for pivotal movement about the pivot pins 48.

As illustrated in FIG. 1, each of the mowers includes a supporting frame structure 54 from which the cutting units 56 and conditioning units 58 are supported with these components being conventional and a part of the existing mower. The supporting frame structure 54 includes upstanding lugs 60 which straddle and are pivotally connected to the outer end of the floating arm 42 by a pivot pin or bolt 62 as shown in FIGS. 2 and 3 thereby supporting the mowers 12 from the main frame. The pitch angle of each of the mowers 12 is varied by a hydraulic ram 64 which includes a piston and cylinder assembly having one end thereof pivotally connected to a lug 66 on the lower surface of rigid arm 36 by a pivot pin or bolt 68. The other end of the ram 64 is connected to a vertical arm 70 by an adjustable pivot pin or bolt 72. The vertical arm 70 has its lower end connected to upstanding lugs 74 connected to the frame 54 with the lugs 74 being spaced from each other towards the front and rear of the mower 12 to receive the lower end of the arm 70 therebetween as illustrated in FIG. 3. A pivot pin or bolt 76 extends through the lugs 74 and the lower end of the arm 70 to pivotally connect the arm 70 to the frame 54 of the mower 12 thus enabling the mower 12 to vary its angle about a longitudinal axis defined by the pivot bolt or pin 76. Hydraulic lines 78 are connected to the ram 64 and extend into the operator's cab to enable the operator to control the pitch angle of the mowers 12 by expanding or retracting the hydraulic ram 64.

The arms 36 and 42 which extend forwardly from the main frame are set at slightly more than 90° to the main frame and thus diverge outwardly but only to a relatively small degree which allows the mowers to set at slight opposing angles as illustrated in plan in FIG. 5. The arms are of equal length but the mounting structure for the left arms is slightly longer to allow the left mower to be mounted ahead of the right mower as observed from the front of the combination as illustrated in FIGS. 1 and 4.

Depending from the frame member 34 is a pair of rear frame members 80 interconnected by a bottom frame member 82. As illustrated in FIG. 4, a tubular support member 84 is rigidly affixed to and depends from the frame member 34 with a gear box 86 supported at the lower end thereof which includes an input sprocket gear 88 and an output drive shaft 90 that includes universal joints 92 and may be telescopic with the outer end of the drive shaft being connected to a jack shaft 93 supported by bearing blocks 94 supported from the mower frame 54. A multi-pulley and belt drive unit generally designated by reference numeral 96 interconnects the jack shaft 93 and the input drive shaft for the mower 12. The opposite end of the frame member 34 includes a depending support structure 98 for a gear box 100 having a notched pulley input 102 which receives a notched drive belt 103 that extends rearwardly and 16 as shown in FIG. 5. The input sprocket 88 on the gear box 86 is positioned alongside of an output sprocket 106 on the header housing 16 and is coupled thereto by a flexible, roller chain coupling 107 in which the chain encircles the two side-by-side sprocket gears 88 and 106 as shown in FIG. 2. Thus, the two mowers 12 are driven independently from opposite sides of the header housing 16 with the left mower 12 being driven by a notched belt drive arrangement including a Gates notched belt and associated drive and driven notched pulleys or wheels with the right hand mower as observed from the front of the unit being driven from the sprocket gear 106 to the sprocket gear 88 by the chain coupling. The gear box 86 is drivingly connected to the right mower 12 as previously described and the gear box 100 is drivingly connected to the left mower 12 by the use of a similar drive shaft and belt drive arrangement generally designated by reference numeral 108 as illustrated in FIG. 1. Also as illustrated in FIG. 1, bracing 110 is provided between the support plates 38 and the frame members 80 and 82 and, as illustrated in FIG. 2, gusset plates 112 are provided along the underside of the plates 38 thus further rigidifying the main frame 32.

An elongated supporting member 114 which is slightly bowed as illustrated in FIG. 2 interconnects the supporting structure for the bearing blocks 94 for the jack shaft 93 connected to the end of the drive shaft 90 and the mower frame 54 in order to keep the belt drive 96 properly tensioned and to rigidify one end portion of the mower 12. A similar support member 116 is provided for the drive belt assembly 108 for the left hand mower 12 as illustrated in FIG. 1.

Figure 4:
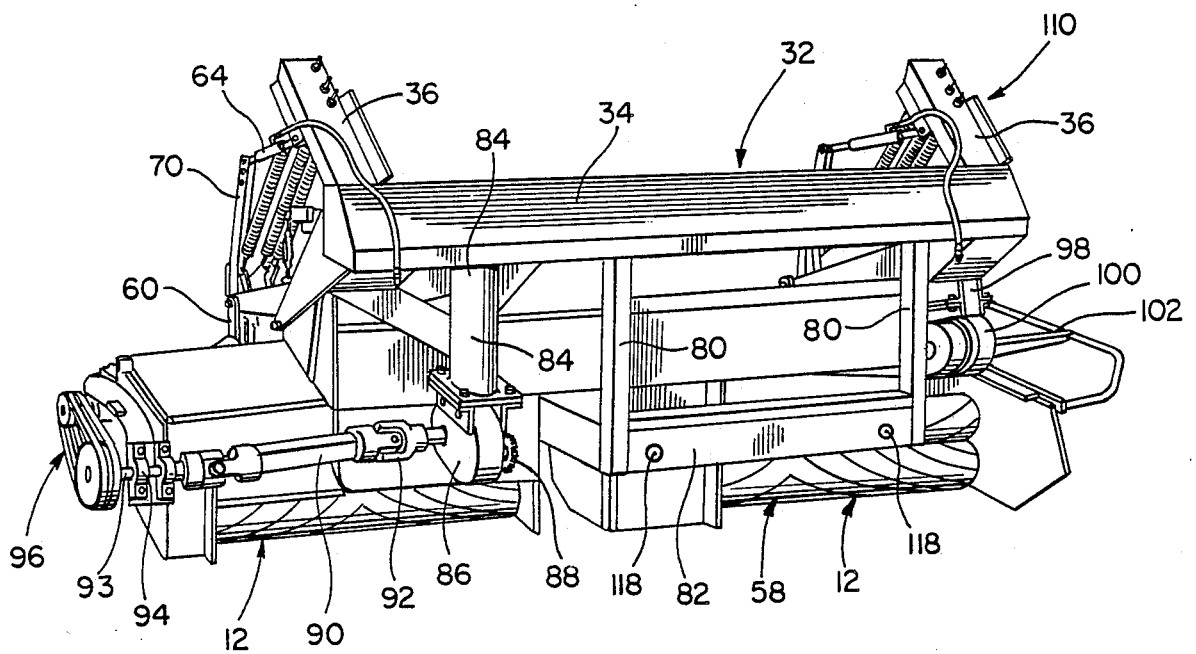
FIG. 4 is a rear perspective view of the attachment illustrating the main frame and gear box and drive arrangements.

The transverse frame member 34 rests on the header housing 16 inwardly of a flange or ledge 22 on the housing 16 and the lower end of the housing is connected to the main frame 32 by projecting pins (not shown) received in apertures or sockets 118 in the bottom frame member 82 as shown in FIG. 4. Various quick connect means may be provided depending upon the existing structure on the combine which in some instances include pivotal latch structures which secure connecting pins. The manner of connecting the attachment 10 of the invention to the combine 14 will be compatible with the structure which normally connects the combine feeder housing 16 to existing interchangeable headers for quick and easy removal thereof.

As indicated previously, the combine 14 including its header housing and other structural components are conventional and commercially available. Also, the mowers 12 are conventional and commercially available. The present invention constitutes the attachment 10 including its specific structure and its specific association with the commercially available combine and mowers. With only minor changes, the attachment may be adapted for use with various types of combines and various types of mowers. The Kuhn mower was originally constructed to be mounted on the rear and to the side of a tractor. When associated with the attachment 10 of this invention, the hitch assembly normally supplied on the Kuhn mower has been removed which enables the mowers to be attached to the attachment 10 in front of the combine 14 with the attachment being easily removed or installed thereby permitting the combine to be free to be used for other harvesting operations with other headers supplied with the combine.

Essentially, the attachment 10 includes the main frame 32 which rests on the feeder housing when installed in the same manner that all headers supplied with the combine rest on the header and are detachably connected thereto in the same manner as all other supplied headers are attached such as by pin and latch structures at the lower end of the feeder housing and at the lower end of the attached header. The main frame 34 has two floating arms with springs and rigid arms associated therewith extending forwardly therefrom in slightly divering relation to position the mowers at slight opposing angles with the left arm and mounting cradle being slightly longer thereby allowing the left mower to be mounted slightly ahead of the right mower in order to avoid interference and contact between the mowers as well as orienting them in slight angular relation as illustrated in FIG. 5. The mounting tubular members 114 and 116 each are of generally U-shaped configuration with the outer end portion of each tubular member being pivoted to the mower with the hydraulic cylinder or ram 64 enabling the mowers to be adjusted fore and aft to change the pitch of the mower cutting angle.

Power for driving the mowers is taken from both sides of the feeder housing on the combine with one side of the mower being driven by a flexible chain coupling and the other side being driven by a notched belt and pulley assembly. The two gear boxes are then drivingly connected to the mowers 12 by a similar three-groove pulley and three belts which extend from the drive shaft and jack shaft to the input shaft on the existing mower gear box.

Figure 6:
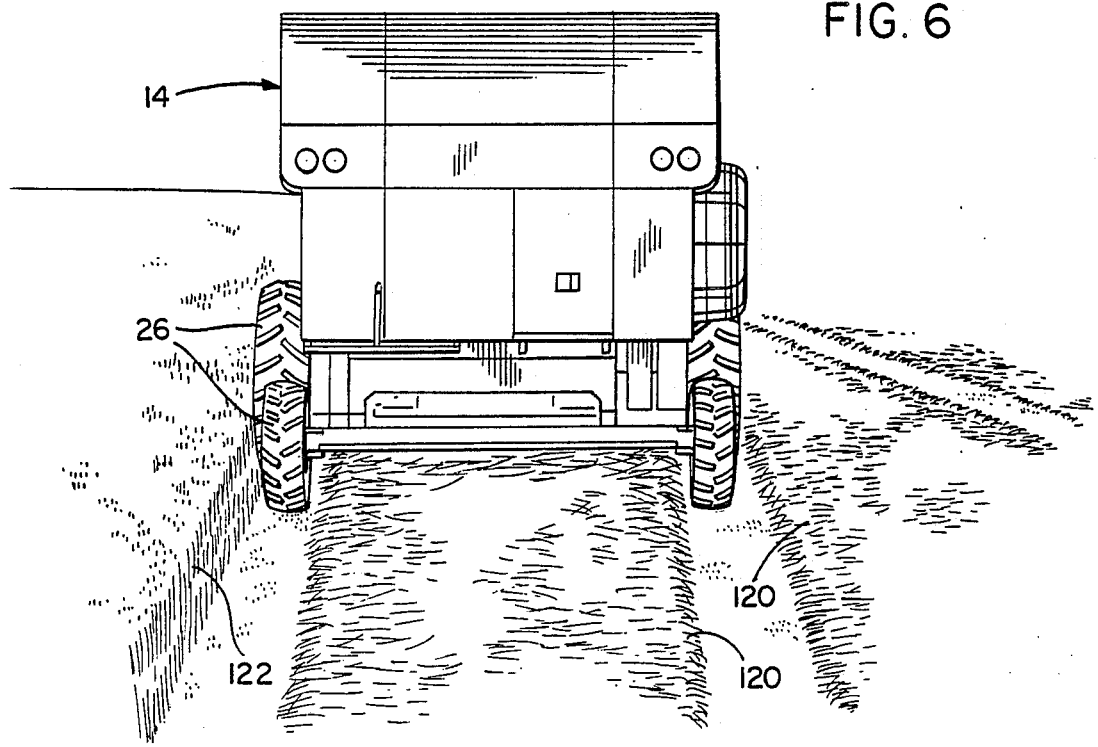
FIG. 6 is a rear view of the combine illustrating the single windrow formed by the combine attachment of this invention.

The hydraulic rams 64 tilt the mowers fore and aft to change the cutting angle with the unique joint structure formed by the tubular supports 114 and 116, the supporting arm 70, swivel joint 76, pivot support 48, supporting floating arms 42, springs 52 and rigid arms 36 all cooperating to floatingly support the mowers 12 with the pitch angle being adjustable by utilizing the rams 64. The attachment enables two existing mowers to be placed alongside each other in front of a self-propelled power unit which enhances visibility and mobility in front of the combine or power unit with the opposing angles of the mowers depositing the cut material side-by-side to form a single windrow 120 as illustrated in FIG. 6 which illustrates that the uncut crop or hay 122 is cut, conditioned and deposited in a single windrow 120 to the rear of the combine 14.

As shown in FIG. 2, a height sensor 124 is mounted on bracing 38 rigid with arm 36 with an adjustable turnbuckle 126 connecting the floating arm 42 with an input of the sensor 124 in order for the sensor to indicate the elevational relationship of the arms 42 together with the mowers 12 supported therefrom. With this arrangement, the sensors 124 which are commercially available electronic sensors stabilize each of the mowers as to their elevation by electronic signals through the hydraulic system of the combine. Also, the mowers 12 are interconnected by a stabilizer 128 pivotally connected to the forward portion of each of the mowers 12 as shown in FIGS. 1 and 5. The stabilizer 128 is a pair of telescopic tubular members having limited telescopic movement to limit movement of the mowers 12 toward each other to avoid contact and to limit outward movement of the mowers during pivotal movement about transverse and longitudinal axes. Further, while the attachment has been illustrated at the front of the combine or power unit, it could also be made to be attached to the rear of a power unit.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. An attachment for supporting a pair of mower-conditioners in front of a self-propelled combine or power unit having a forwardly extending header housing with header attachment means incorporated thereon and header output drive means at opposite sides thereof and each of the mower-conditioners including a frame and input drive shaft, said attachment comprising a main frame adapted to be supportingly connected to the header housing of the combine and adapted to extend transversely at the forward end of the combine, said main frame including a pair of supporting arm assemblies with each supporting arm assembly adapted to supportingly engage a mower-conditioner to support the mower-conditioners from the frame, means on the main frame for driving connection with the output drive means on the header housing and the input drive shaft on the mower-conditioners, and means interconnecting the main frame and mower-conditioners to adjust the pitch angle of the mower-conditioners about a substantially transverse axis to vary the operating conditions thereof, said main frame including a transversely extending rigid frame member adapted to rest on the header housing when supported therefrom, each supporting arm assembly including a rigid arm extending forwardly from the frame member, a floating arm extending forwardly from the frame member and being pivotally supported therefrom, spring means interconnecting the rigid arm and floating arm adjacent the outer ends thereof to resiliently support the outer end of the floating arm, and means at the outer end of the floating arm to support the mower-conditioner, said means supporting the mower-conditioner from the outer end of the floating arm including means enabling pivotal movement of the mower-conditioner about a transverse axis at the outer end of the floating arm, said spring means including a plurality of tension coil springs connected between the rigid arm and floating arm and means adjusting the spring resistance of the spring means, each supporting arm assembly also including an angular tubular support connected to the main frame and extending forwardly therefrom and provided with a laterally extending forward end swivelly connected to the mower-conditioners.

2. The structure as defined in claim 1 wherein each means to adjust the mower-conditioner about a transverse axis includes a hydraulic ram interconnecting the rigid arm and mower-conditioner in spaced relation to the connection between the mower-conditioner and the end of the floating arm to vary the pitch of the mower-conditioner about a transverse axis.

3. The structure as defined in claim 2 wherein said supporting arm assemblies extend forwardly and diverge at a slight angle in relation to each other to angle the mower-conditioners in opposite directions to deposit cut and conditioned hay in a single windrow.

4. The structure as defined in claim 1 wherein said means for driving connection with the header output drive mean each includes a gear box, a drive shaft and drive belt and pulley arrangement interconnecting the gear box and input drive shaft for the mower-conditioner.

5. The structure as defined in claim 4 wherein each of said gear boxes includes an input drive member, one of the input drive members being a sprocket gear and the other of the input drive members being a notched pulley, said sprocket gear being positioned alongside a sprocket gear forming the header output drive means at one side of the feeder housing and being connected thereto by a chain coupling having a width at least equal to the width of the two sprocket gears and encircling the two sprocket gears to provide a flexible chain coupling therebetween, the notched pulley being positioned in spaced alignment with a notched output member forming the header output drive means at the other side of the feeder housing, said notched output member and said notched pulley forming the input drive member on the gear box being engaged by an encircling notched belt thereby providing independent and diverse drive arrangements between the opposite sides of the feeder housing and the two gear boxes on the main frame.

6. The structure as defined in claim 5 wherein said hydraulic ram is connected to an offset arm at the forward end thereof with the offset arm being pivoted to the ram by a pivot pin extending transversely of the main frame, said offset arm having its lower end connected to the mower-conditioner by a front-to-rear pivot pin to provide a swivel connection between the ram and mower-conditioner having a fore-to-aft pivot axis thereby enabling upward pivotal thrust to be exerted on the mower-conditioner by the ram to vary the pitch angle thereof.

7. An attachment for supporting a pair of mower-conditioners having rotary cutting elements rotatable about vertical axes from a power unit having output drive means, each of the mower-conditioners including a frame and input drive shaft, said attachment comprising a main frame adapted to be supportingly connected to the power unit and adapted to extend transversely thereof, said main frame including a pair of supporting arm assemblies with each supporting arm assembly adapted to supportingly engage a mower-conditioner to support the mower-conditioners from the frame in angulated relation to form a single windrow, means on the main frame for driving connection with the output drive means on the power unit and the input drive shaft on the mower-conditioners, and means interconnecting the main frame and mower-conditioners to adjust the vertical angle of the rotational axes of the cutting elements to vary the pitch angle of the mower-conditioners about a substantially transverse axis to vary the operating conditions thereof.

8. The structure as defined in claim 7 wherein said main frame includes a transversely extending rigid frame member, each supporting arm assembly including a rigid arm extending outwardly from the frame member, a floating arm extending outwardly from the frame member and being pivotally supported therefrom, spring means interconnecting the rigid arm and floating arm adjacent the outer ends thereof to resiliently support the outer end of the floating arm, and means at the outer end of the floating arm to support the mower-conditioner.

9. The structure as defined in claim 8 wherein said means supporting the mower-conditioner from the outer end of the floating arm includes means to enable pivotal movement of the mower-conditioner about a transverse axis at the outer end of the floating arm, said spring means including tension coil spring means connected between the rigid arm and floating arm and means adjusting the spring resistance of the spring means, said means to adjust the pitch angle of the mower-conditioner about a transverse axis including a hydraulic ram interconnecting the rigid arm and mower-conditioner in spaced relation to the connection between the mower-conditioner and the end of the floating arm to vary the pitch or angle of the mower-conditioner about a transverse axis.

10. The structure as defined in claim 8 together with sensor means associated with the rigid arm and floating arm to indicate the elevation position of the mower-conditioners and stabilize the elevation of the mower-conditioners.

11. The structure as defined in claim 7 together with a stabilizer interconnecting the mower-conditioners to limit their lateral movement in relation to each other.

12. An attachment for supporting a pair of mower-conditioners in front of a self-propelled combine or power unit having a forwardly extending header housing with header attachment means incorporated thereon and header output drive means at opposite sides thereof, each of the mower-conditioners including a frame and input drive shaft, said attachment comprising a main frame adapted to be supportingly connected to the header housing of the combine and adapted to extend transversely at the forward end of the combine, said main frame including a pair of supporting arm assemblies with each supporting arm assembly adapted to supportingly engage a mower-conditioner to support the mower-conditioners from the frame, means on the main frame for driving connection with the output drive means on the header housing and the input drive shaft on the mower-conditioners, and means interconnecting the main frame and mower-conditioners to adjust the pitch angle of the mower-conditioners about a substantially transverse axis to vary the operating conditions thereof, said main frame including a transversely extending rigid frame member adapted to rest on the header housing when supported therefrom, each supporting arm assembly including a rigid arm extending forwardly from the frame member, a floating arm extending forwardly from the frame member and being pivotally supported therefrom, tension coil spring means interconnecting the rigid arm and floating arm adjacent the outer ends thereof to resiliently support the outer end of the floating arm, and means at the outer end of the floating arm to support the mower-conditioner, said means supporting the mower-conditioner from the outer end of the floating arm including means enabling pivotal movement of the mower-conditioner about a transverse axis at the outer end of the floating arm, each supporting arm assembly further comprising a support member connected to the main frame and extending forwardly therefrom and provided with means at the forward end pivotally connected to the mower-conditioners for pivotal movement of the mower-conditioners about a transverse axis.

13. The structure as defined in claim 12 wherein each means to adjust the mower-conditioner about a transverse axis includes a hydraulic ram interconnecting the rigid arm and mower-conditioner in spaced relation to the connection between the mower-conditioner and the end of the floating arm and in spaced relation to the pivotal connection between the support member and the mower-conditioner to vary the pitch of the mower-conditioner about a transverse axis.

14. The structure as defined in claim 12 wherein said supporting arm assemblies extend forwardly and diverge at a slight angle in relation to each other to angle the mower-conditioners in opposite directions to deposit cut and conditioned hay in a single windrow.

15. The structure as defined in claim 12 wherein said means for driving connection with the header output drive means each includes a gear box, a drive shaft and drive belt and pulley arrangement interconnecting the gear box and input drive shaft for the mower-conditioner.

16. The structure as defined in claim 15 wherein each of said gear boxes includes an input drive member, one of the input drive members being a sprocket gear and the other of the input drive members being a notched pulley, said sprocket gear being positioned alongside a sprocket gear forming the header output drive means at one side of the feeder housing and being connected thereto by a chain coupling having a width at least equal to the width of the two sprocket gears and encircling the two sprocket gears to provide a flexible chain coupling therebetween, the notched pulley being positioned in spaced alignment with a notched output member forming the header output drive means at the other side of the feeder housing, said notched output member and said notched pulley forming the input drive member on the gear box being engaged by an encircling notched belt thereby providing independent and diverse drive arrangements between the opposite sides of the feeder housing and the two gear boxes on the main frame.

* * * * *